United States Patent
Ouchi

(10) Patent No.: US 6,240,064 B1
(45) Date of Patent: May 29, 2001

(54) RING STRUCTURE 1:N DUPLEX COMMUNICATION EQUIPMENT AND DATA COMMUNICATION METHOD

(75) Inventor: Haruko Ouchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/845,036

(22) Filed: Apr. 21, 1997

(30) Foreign Application Priority Data

Apr. 19, 1996 (JP) .................................................. 8-098513

(51) Int. Cl.[7] .................................................. G01R 31/08
(52) U.S. Cl. .................................................. 370/223
(58) Field of Search .................................. 370/223, 224, 370/364, 365, 450, 452, 454, 424, 434, 276; 340/827

(56) References Cited

U.S. PATENT DOCUMENTS

| | | | |
|---|---|---|---|
| 4,615,029 | * | 9/1986 | Hu et al. ................................. 370/89 |
| 5,150,356 | * | 9/1992 | Tsutsui ................................... 370/223 |
| 5,166,675 | * | 11/1992 | Amemiya et al. .................... 340/825 |
| 5,191,579 | * | 3/1993 | Matsushita et al. ............... 370/85.15 |
| 5,278,824 | * | 1/1994 | Kremer ................................. 370/223 |
| 5,282,200 | * | 1/1994 | Dempsey et al. ..................... 370/245 |
| 5,581,710 | * | 12/1996 | Noel, Jr. et al. ................. 395/200.21 |
| 5,657,446 | * | 8/1997 | Pinard et al. ....................... 379/90.01 |
| 5,745,476 | * | 4/1998 | Chaudhuri ............................ 370/222 |
| 5,793,754 | * | 8/1998 | Houldsworth et al. .............. 370/276 |
| 5,799,001 | * | 8/1998 | Lee et al. ............................. 370/220 |
| 5,815,490 | * | 9/1998 | Lu ......................................... 370/223 |
| 5,901,137 | * | 5/1999 | Nakabayashi ........................ 370/222 |
| 5,982,747 | * | 11/1999 | Ramfelt et al. ...................... 370/224 |

\* cited by examiner

*Primary Examiner*—Ajit Patel
*Assistant Examiner*—Brian Nguyen
(74) *Attorney, Agent, or Firm*—Sughrue, Mion, Zinn, Macpeak & Seas, PLLC

(57) ABSTRACT

1:N duplex communication equipment which has a host device and slave devices interconnected in a ring form is disclosed. In the equipment, the path distributing part 3 of the host device transmits an identical path to the two-way transmission line of the ring, and a path selecting part 4 selects a normal one of paths from the two-way transmission lines. The path distributing part 6 of each slave device distributes a path from one transmission line to the other transmission line and the path selecting part. A path selecting part 5 selects paths sent from the host device through the two-way transmission lines from the path distributing part. A path selecting part 8 selects a path sent from another slave device through the two-way transmission lines and outputs this path to a transmitted data control part 9. The transmitted data control part 9 selects data to be transmitted to the host device from received data in the selected path and transmitted data of its own device. A path transmitting part 10 transmits data from the transmitted data control part through the paths of the two-way transmission lines. Thus, 1:N bi-directional communication is performed by a smaller number of paths.

12 Claims, 2 Drawing Sheets

RING STRUCTURE 1:N DUPLEX COMMUNICATION EQUIPMENT AND DATA COMMUNICATION METHOD

BACKGROUND OF THE INVENTION

The present invention relates to ring structure 1:N duplex communication equipment in which a host device and a plurality of slave devices are interconnected in a ring form in two ways, and more particularly to 1:N duplex communication equipment for transmitting data from a specified slave device in response to multi-address data which has been sent from the host device.

Referring to FIG. 2, there is shown 1:N duplex communication equipment, which has conventionally been used. Paths 1 to n respectively interconnect a host device 21 and a plurality of slave devices 22-1 to 22-n.

The host device 21 includes a path distributing part 23 for distributing the plurality of paths 1 to n, a plurality of path selecting parts 25-1 to 25-n for selecting paths from the slave devices 22-1 to 22-n of two-way transmission lines and a received data selecting part 26 for selecting effective received data upon receiving data from the selected plurality of paths. These parts are arranged for transmitting multi-address data to the plurality of slave devices 22-1 to 22-n. The plurality of slave devices 22-1 to 22-n include path selecting parts 27-1 to 27-n for selecting paths from the two-way transmission lines and path transmitting parts 24-1 to 24-n for distributing received data to the paths of the two-way transmission lines.

The host device 21 transmits data having identical information through the plurality of paths 1 to n. The slave devices receive the data transmitted from the host device through the paths selected by the path selecting parts 27-1 to 27-n. When there is data to be transmitted, each of the slave devices 22-1 to 22-n transmits a data effective signal together with the data to be transmitted through the path. The paths from the slave devices 22-1 to 22-n are respectively distributed to the two-way transmission lines in the path transmitting parts 24-1 to 24-n.

In the host device, the paths 1 to n from the two-way transmission lines are respectively selected by the path selecting parts 25-1 to 25-n and received data is selected from the selected path by the received data selecting part. The host device 21 and the path selecting parts 27-1 to 27-n of the slave devices 22-1 to 22-n operate so as to select a normal transmission line when one transmission line fails.

The conventional 1:N duplex communication equipment described above with reference to FIG. 2 is disadvantageous in that the same number of paths as that of slave devices is needed.

SUMMARY OF THE INVENTION

A purpose of the present invention is to provide ring structure 1:N duplex communication equipment, whereby 1:N bi-directional communication can be performed with a smaller number of paths.

The purpose of the present invention is achieved by ring structure 1:N duplex communication equipment comprising a host device, a plurality of slave devices, a first transmission line and a second transmission line for transmitting data in a direction opposite to that for the first transmission line, wherein the host device and the plurality of slave devices are interconnected in a ring form by the first and second transmission lines, the host device includes a host distributing part and a host path selecting part, and each of the slave devices includes a first slave path selecting part, a slave path distributing part, a second slave path selecting part, a transmitted data control part and a path transmitting part.

The host path distributing part which the host device has transmits the same path to the first and second transmission lines, and the host path selecting part selects a path from the first and second transmission lines.

The first slave path selecting part which each slave device has selects paths which are transmitted through the first and second transmission lines from the host device. The slave path distributing part distributes a path from the first transmission line to the second transmission line and the slave path selecting part. The second slave path selecting part selects paths which are transmitted through the first and second transmission lines from the other slave devices. The transmitted data control part selects data to be transmitted to the host device from received data in the paths selected by the second slave path selecting part and transmitted data of its own device. The path transmitting part transmits the data from the transmitted data control part through paths to the first and second transmission lines.

Data to be transmitted is transmitted from the host device through the path 1 to the two-way transmission lines. In each slave device, the path 1 is transmitted to the adjacent slave device by the path distributing part and output to the slave path selecting part. Paths from both transmission lines are selected by the slave path selecting part and the transmitted data from the host device is output.

A signal transmitted from each slave device is compared with data transmitted from the other slave devices in the transmitted data control part of its own. If transmission is permitted, the signal is output from the transmitted data control part and sent from the path transmitting part to the two-way transmission lines through the path 2. The host device selects the path 2 for the two-way transmission lines by the slave path selecting part and receives the data.

The host path selecting part of the host device and the slave path selecting part of the slave device operate so as to select a normal transmission line when one transmission line fails.

BRIEF DESCRIPTION OF THE DRAWINGS

This and other objects, features and advantages of the present invention will become more apparent upon a reading of the following detailed description and drawings, in which.

DESCRIPTION OF THE PREFERRED EMBODIMENTS

The embodiment of the ring structure 1:N duplex communication equipment of the present invention will be described in detail below with reference to the accompanying drawing.

Figure 1:
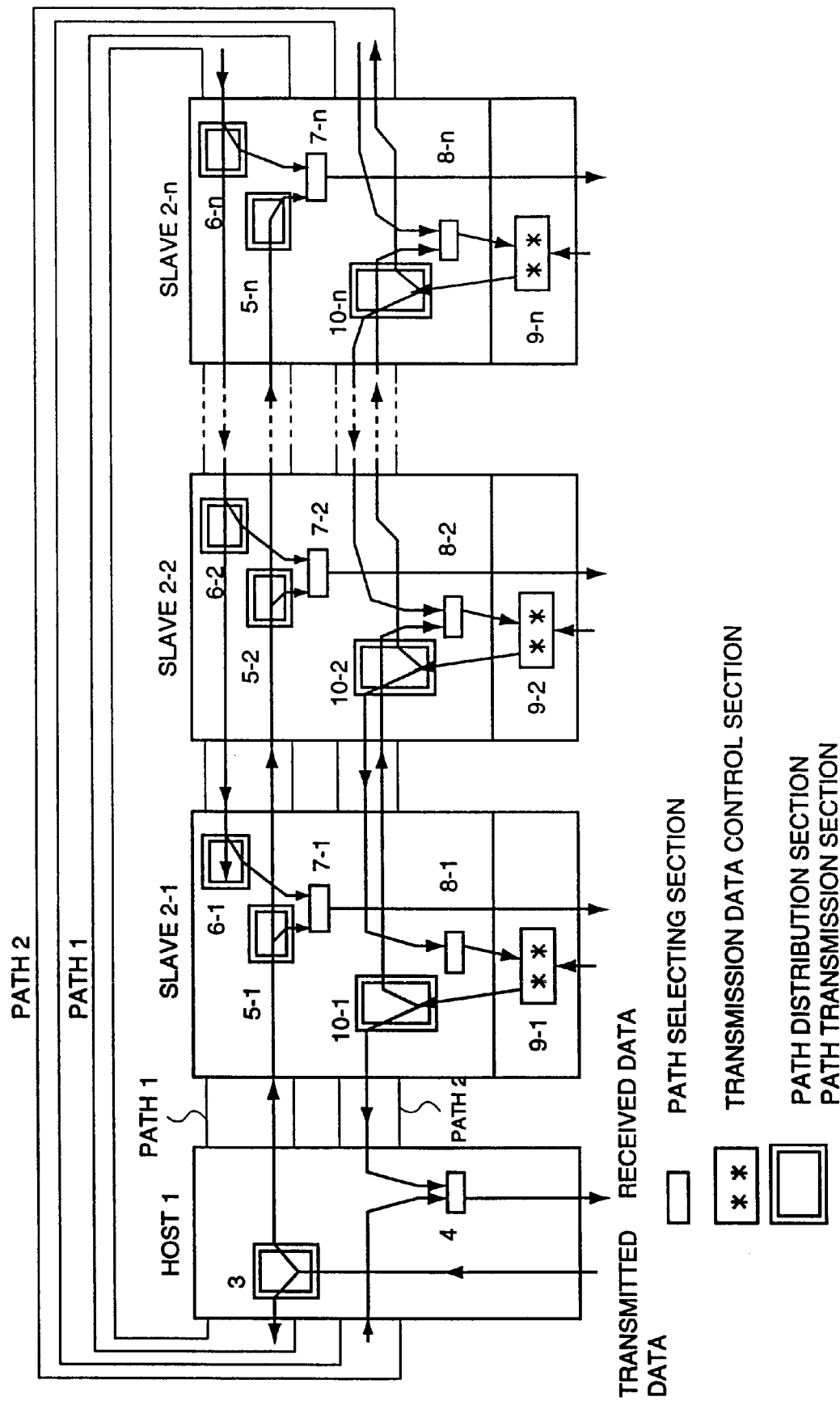
FIG. 1 is a constitutional view showing an embodiment of ring structure 1:N duplex communication equipment of the present invention.
Figure 2:
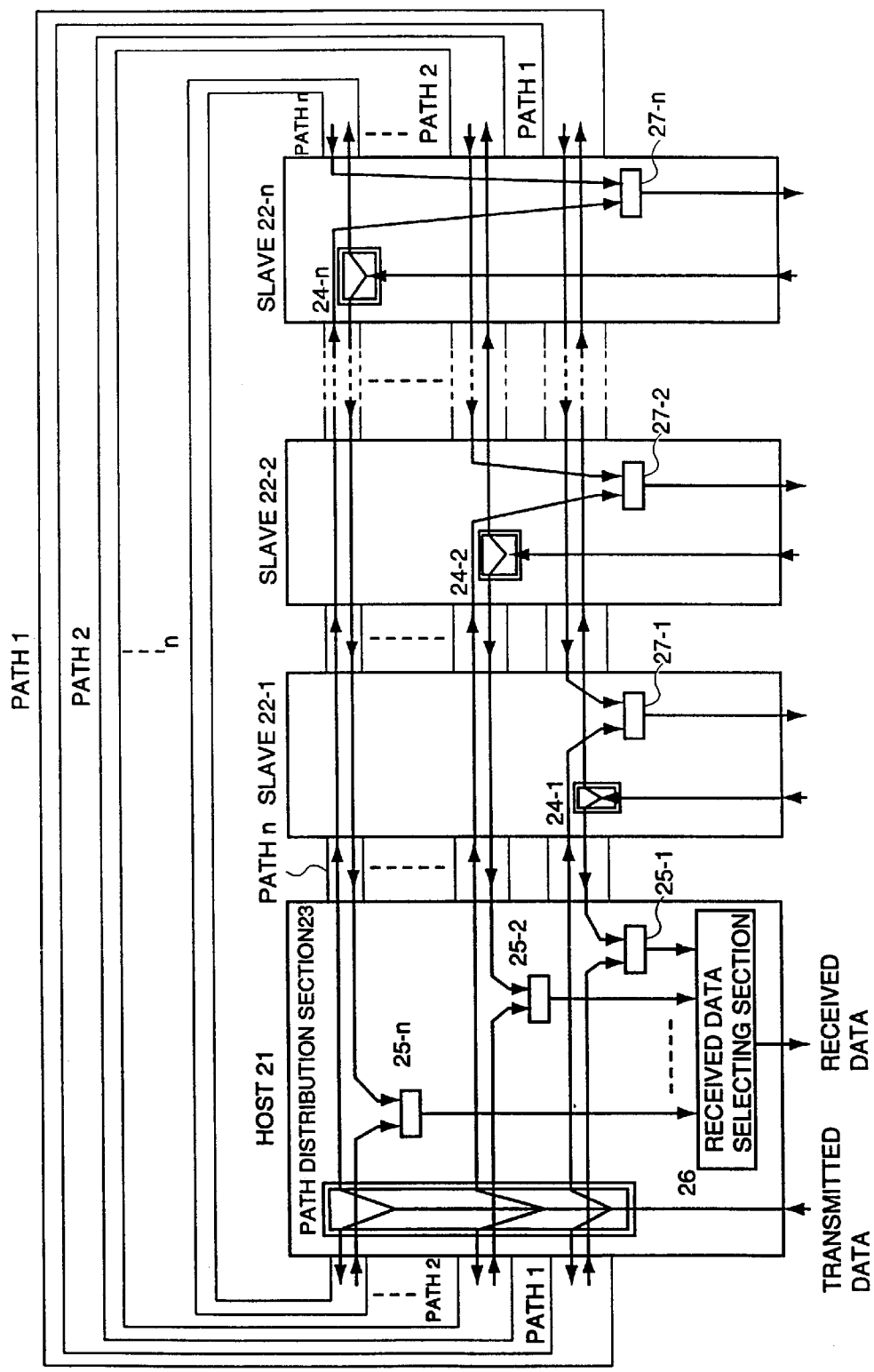
FIG. 2 is a constitutional view showing an example of conventional ring structure 1:N duplex communication equipment.

Referring now to FIG. 1, there is shown a constitution of an embodiment of a ring structure 1:N duplex communication equipment of the present invention. In the ring structure 1:N duplex communication equipment of the present invention, a host device 1 and a plurality of slave devices 2-1 to 2-n are interconnected in a ring form through two transmission lines. In the host device 1, there are arranged a path distributing part 3 and a host path selecting part 4. In the slave devices 2-1 to 2-n, there are respectively arranged path distributing parts 5-1 to 5-n and 6-1 to 6-n, slave path selecting parts 7-1 to 7-n and 8-1 to 8-n, transmitted data control parts 9-1 to 9-n and path transmitting parts 10-1 to 10-n.

The path distributing part 3 of the host device 1 transmits the same path 1 to the two-way transmission lines of the ring. The host path selecting part 4 selects a path 2 from the two-way transmission lines.

The path distributing parts 5-1 to 5-n and 6-1 to 6-n of the slave devices 2-1 to 2-n distribute paths from the transmission line of one direction to the transmission line of another direction and the slave path selecting parts 7-1 to 7-n. The slave path selecting parts 7-1 to 7-n select the path 1 which is transmitted from the host device through the two-way transmission lines of the path distributing parts 5-1 to 5-n and 6-1 to 6-n.

The slave path selecting parts 8-1 to 8-n select the path 2 which is transmitted from the other slave devices through the two-way transmission lines and output this path to the transmitted data control parts 9-1 to 9-n. Each of the transmitted data control parts 9-1 to 9-n selects data to be transmitted to the host device from received data in the selected path and the transmitted data of its own device. The path transmitting parts 10-1 to 10-n transmits data from the transmitted data control parts 9-1 to 9-n through the path 2 to the two-way transmission lines.

Data to be transmitted is transmitted from the host device 1 through the path 1 to the two-way transmission lines. In each slave device, the path 1 is transmitted to the adjacent slave device by each of the path distributing parts 5-1 to 5-n and 6-1 to 6-n and output to each of the slave path selecting parts 7-1 to 7-n. The path from the two-way transmission lines is selected by each of the slave path selecting parts 7-1 to 7-n and the transmitted data from the host device 1 is output.

A signal transmitted from each of the slave devices 2-1 to 2-n is compared with data transmitted from the other slave devices in the transmitted data control parts 9-1 to 9-n of its own. If permitted, this signal is output from each of the transmitted data control part 9-1 to 9-n and sent from each of the path transmitting parts 10-1 to 10-n through the path 2 to the two-way transmission lines. In the host device, the path 2 of the transmission lines is selected by the host path selecting part 4 and then the data is received.

The path selecting part 4 of the host device 1 and the slave path selecting parts 7-1 to 7-n and 8-1 to 8-n of the slave devices 2-1 to 2-n operate so as to select a normal transmission line when one transmission line fails.

As described above, according to the present invention, each slave device is provided with a path distributing part, and data from the host device is transmitted to each slave device only through the path 1. Each slave device is further provided with a transmitted data control part, and effective received data is always transmitted from the slave device to the host device only through the path 2. Consequently, 1:N bi-directional communication can be performed only through two paths irrespective of the number of slave devices.

Furthermore, the size of the path distributing part of the host device can be reduced and a received data selecting part is unnecessary.

The entire disclosure of Japanese Patent Application No. 8-098513 filed on Apr. 19, 1996, including specification, claims, drawings and summary are incorporated herein by reference in its entirety.

What is claimed is:

1. A ring structure 1:N duplex communication equipment for performing bi-directional data communication comprising:

a host device;

a plurality of slave devices, wherein N equals the number of slave devices;

a first bi-directional transmission line;

a second bi-directional transmission line;

wherein said host device and said plurality of slave devices are interconnected by said first and second bi-directional transmission lines, wherein said first bi-directional transmission line and said second bi-directional transmission line each forms a separate ring, said host device is provided with a host path distributing part connected to said first bi-directional transmission line for data transmission to said plurality of slave devices and a host path selecting part connected to said second bi-directional transmission line for data reception from said plurality of slave devices, and each of said plurality of slave devices further comprising:
a first slave path distributing part connected to said first bi-directional transmission line,
a second slave path distributing part connected said first bi-directional transmission line,
a first slave path selecting part connected to said first slave path distributing part and said second slave path distributing part,
a second slave path selecting part connected to said second bi-directional transmission line,
a path transmitting part connected to said second bi-directional transmission line, and
a transmitted data control part connected to said path transmitting part and to said second slave path selecting part.

2. The ring structure 1:N duplex communication equipment of claim 1, said first bi-directional transmission line further comprises a first data path and a second data path.

3. The ring structure 1:N duplex communication equipment of claim 2, wherein:

said host path distributing part is connected to both said first and second data paths of said first bi-directional transmission line, said first slave path distributing part is connected to said first data path of said first bi-directional transmission line, and said second slave path distributing part is connected to said second data path of said first bi-directional transmission line.

4. The ring structure 1:N duplex communication equipment of claim 3, wherein said host path distributing part transmits data from said host device over said first and second paths of said first bi-directional transmission line.

5. The ring structure 1:N duplex communication equipment of claim 3, wherein said first slave path selecting part selects either said first or second slave path distributing part to receive data transmitted over said first bi-directional transmission line from said host device, the received data being output to its own slave device.

6. The ring structure 1:N duplex communication equipment of claim 1, said second bi-directional transmission line further comprises a first data path and a second data path.

7. The ring structure 1:N duplex communication equipment of claim 6, wherein said host path selecting part is connected to both said first and second data paths of said second bi-directional transmission line.

8. The ring structure 1:N duplex communication equipment of claim 7, wherein said transmitted data control part selects either data received from adjacent slave devices or data from its own slave device to be transmitted by said path transmitting part over said second bi-directional transmission line.

9. A data communication method using ring structure 1:N duplex communication equipment for performing bi-directional data communication with a host device comprising a host path distributing part and a host path selecting part, and a plurality of slave devices, wherein each slave device further comprises first and second slave path distributing parts connected to a first slave path selecting part, and a second slave path selecting part and a path transmitting part connected to a transmitted data control part, said data communication method comprising:

interconnecting said host device and said plurality of slave devices with a first bi-directional transmission line and a second bi-directional transmission line, wherein said first bi-directional transmission line is connected to said host path distributing part of said host device and to said first and second slave path distributing parts of each slave device, and said second bi-directional transmission line is connected to said host path selecting part of said host device and to said second slave path selecting part and said path transmitting part of each slave device, wherein each bi-directional transmission line forms a separate ring, and wherein N equals the number of slave devices;

transmitting data from said host device to each of said plurality of slave devices across said first bi-directional transmission line, wherein said host path distributing part of said host device selects at least one path in said first bi-directional transmission line for transmitting data to said plurality of slave devices; and transmitting data from each of said plurality of slave devices to said host device through said second bi-directional transmission line, wherein said path transmitting part of each slave device selects at least one path in said second bi-directional transmission line for transmitting data and said transmitted data control part of each slave device transmits either its own data or data received from one of said plurality of slave devices.

10. The data communication method using ring structure 1:N duplex communication equipment as claimed in claim 9, wherein the step of transmitting data to the plurality of slave devices further comprises operating said first slave path selecting part, said first and second slave path distributing parts of each slave device to select at least one path in said first bi-directional transmission line for receiving data from said host device.

11. The data communication method using ring structure 1:N duplex communication equipment as claimed in claim 9, wherein the step of transmitting data from the plurality of slave devices further comprises operating said host path selecting part of said host device to select at least one path in said second bi-directional transmission line for receiving data from said plurality of slave devices.

12. The data communication method using ring structure 1:N duplex communication equipment as claimed in claim 9, wherein the step of transmitting data from the plurality of slave devices further comprises:

receiving data from at least one adjacent slave device;

operating said transmitted data control part to select out data for transmission from data generated by the transmitting slave device and the data received from at least one adjacent slave device; and transmitting the selected data across said second bi-directional transmission line.

* * * * *